July 14, 1964 R. C. HILLIARD 3,141,130
PHASE MEASURING CIRCUIT FOR MEASURING THE PHASE BETWEEN AN
F.M. SIGNAL AND AN F.M. REFERENCE SIGNAL INCLUDING
A CATHODE RAY TUBE INDICATOR
Filed March 28, 1962

INVENTOR
Robert C. Hilliard

BY

ATTORNEYS

United States Patent Office 3,141,130
Patented July 14, 1964

3,141,130
PHASE MEASURING CIRCUIT FOR MEASURING THE PHASE BETWEEN AN F.M. SIGNAL AND AN F.M. REFERENCE SIGNAL INCLUDING A CATHODE RAY TUBE INDICATOR
Robert C. Hilliard, Hampton Falls, N.H., assignor, by mesne assignments, to the United States of America as represented by the Secretary of the Navy
Filed Mar. 28, 1962, Ser. No. 183,312
3 Claims. (Cl. 324—88)

This invention relates to a system for measuring the phase relationship between an amplitude modulated reference signal and a frequency modulated signal and more particularly to measuring the phase relationship between an amplitude modulated reference signal and a series of pulses or pulse groups for which the pulse repetition rate is varied at the A.M. frequency.

In certain applications, particularly in missile guidance radar equipment and radar simulation equipment, the basic microwave signal to be processed involves a series of pulses or pulse groups where the repetition rate varies at some A.M. frequency. It becomes necessary at times to conduct an analysis of the characteristics of these signals to determine if the equipment is functioning properly. On the basis of analysis and evaluation of the signal, the equipment can be adjusted to achieve proper operation.

It is a general object of the instant invention to provide a test circuit which is capable of accurately determining the phase relationship of this microwave signal with respect to a reference signal.

It is a primary object to provide a test circuit capable of measuring the phase relationship between an A.M. reference signal and a series of pulses or pulse groups, where the pulse repetition rate is varied at the A.M. frequency, with a minimum of spurious phase shift.

Figure 1:
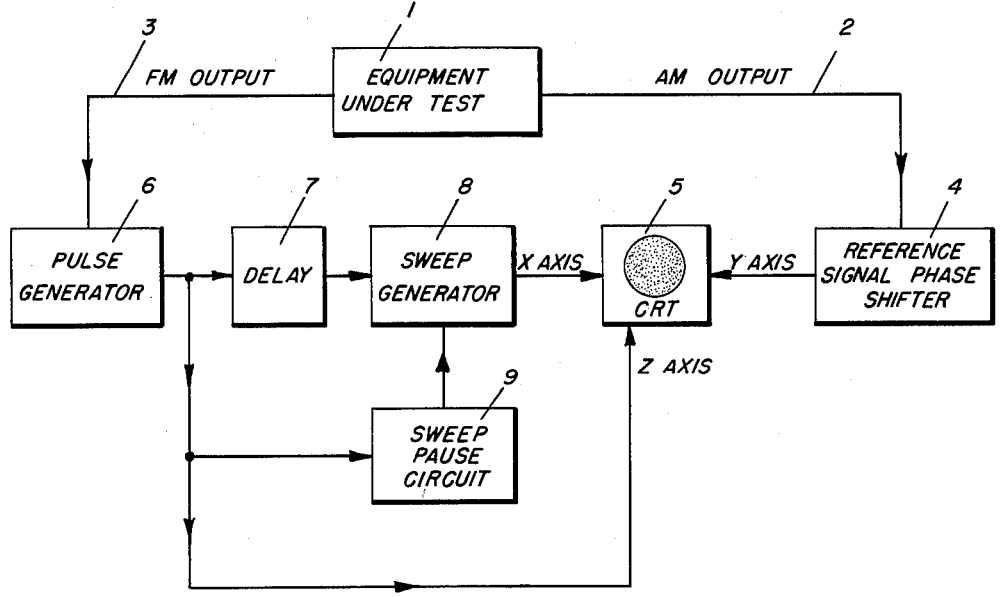
Figure 2:
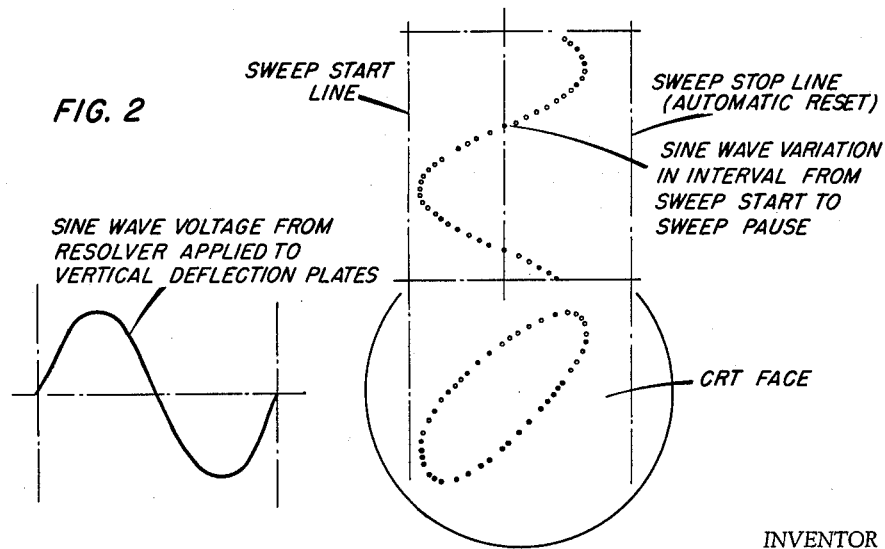

Other objects and many of the attendant advantages of this invention will be readily appreciated as the same becomes better understood by reference to the following detailed description when considered in connection with the accompanying drawings wherein:

FIG. 1 of the drawings shows the circuit embodiment of the instant invention;

FIG. 2 shows wave diagrams representing the signals which are applied to an oscilloscope for Lissajous comparison.

Broadly speaking, the objects of the invention are achieved by applying an amplitude modulated reference signal to the vertical plates of a cathode ray tube oscilloscope while the microwave pulse signal is applied to the horizontal sweep circuit for well known Lissajous comparison.

Referring to FIG. 1 of the drawing, block 1 represents the equipment under test having an amplitude modulated signal output on line 2 and a frequency modulated signal on line 3. The amplitude modulated signal is applied to a phase shifting circuit 4 of any well known type having an output shown in FIG. 2 connected to the vertical plates of oscilloscope 5. The F.M. signal consisting of a series of pulses or pulse groups, the pulse repetition rate of which varies at the A.M. frequency of the reference signal, is applied to pulse generator 6. The pulse generator being triggered by the F.M. signal on line 3 produces an output consisting of a set of uniform pulses, each uniform pulse corresponding to a pulse or group of pulses in the F.M. signal. This set of uniform pulses is fed to sweep generator circuit 8 via delay circuit 7 to initiate a sawtooth sweep signal which is applied to the horizontal plates, or "X" axis, of oscilloscope 5. One sweep is initiated for every pulse or pulse group in the F.M. signal but delayed by delay circuit 7 for a time somewhat less than the shortest time interval between pulses or pulse groups. The duration of the sweep is adjusted so that the sweep time duration plus the delay time is somewhat greater than the maximum time interval between pulses or pulse groups in the F.M. signal. The pulse output from the pulse generator 6 is also fed to a sweep pause circuit 9 which momentarily interrupts the flow of charging current into the sweep generator 8 coincidentally with the occurrence of each pulse and for essentially the time duration of each pulse. After this momentary pause the sweep continues across the face of the oscilloscope until it reaches an automatic reset voltage level whereupon it retraces and awaits the next delayed pulse output from generator 6. The pulse output from generator 6 is additionally fed directly to the "Z" axis or intensifier circuit of oscilloscope 5 to intensify the beam at the precise moment that the sweep pause circuit 9 has interrupted the sweep cycle of sweep generator circuit 8.

From the foregoing description of the circuit of FIG. 1 when considered with the wave diagrams of FIG. 2, it can be seen that a sinusoidal dot pattern produced by the simultaneous pause in the sweep cycle and beam intensification combined in the oscilloscope with the sine wave reference signal of frequency equal to the frequency of the dot pattern creates familiar Lissajous patterns on the face of the scope. The sinusoidal dot pattern is created since the repetition rate of the pulses or pulse groups in the F.M. signal vary in a sinusoidal manner at the A.M. signal frequency as shown in FIG. 2. Because of this fact the pause in each sweep cycle caused by each pulse output from generator 6 occurs at a different time each sweep cycle and varies in a sinusoidal manner thus producing the sine wave variation on the horizontal plates of the oscilloscope. FIG. 2 illustrates the voltages and sweep pause intervals involved in the generation of the out-of-phase Lissajous pattern shown. To produce an in-phase relationship the phase shifter 4 may be adjusted until the ellipse closes to a straight line whereupon the two sine waves will be in phase. It is noted that a stable Lissajous pattern display consists of a number of dots. Since the sweep is stopped at the occurrence of each pulse, time errors with attendant spurious phase shift are minimized.

It will be understood that various changes in the circuit arrangement, which have been herein described and illustrated in order to explain the nature of the invention, may be made by those skilled in the art within the principle and scope of the invention as expressed in the appended claims.

What is claimed is:

1. A circuit arrangement for measuring the phase relationship between an A.M. reference signal and an F.M. signal consisting of a series of pulses or pulse groups having a repetition rate which varies at the A.M. frequency, said circuit arrangement comprising an oscilloscope having a scanning cathode ray beam, means connecting the A.M. reference signal to one set of deflection plates of said oscilloscope, pulse generator means triggered by each pulse or pulse group in said F.M. signal to produce a set of uniform output pulses, means for delaying said set of output pulses, sweep circuit means connected to a second set of deflection plates in said oscilloscope and responsive to each one of said delayed output pulses to initiate a sweep cycle, means responsive to each of said output pulses for momentarily stopping said sweep cycle, and means included in said oscilloscope and responsive to each of said output pulses for intensifying said cathode ray beam at the precise moment that said sweep cycle is stopped whereby stable Lissajous patterns indicative of the phase relationship between the A.M. reference signal and the F.M. signal are displayed on said oscilloscope.

2. The circuit arrangement as claimed in claim 1 wherein said means connecting the A.M. reference signal to one set of deflection plates of said oscilloscope comprises a phase shifting circuit.

3. The circuit arrangement as claimed in claim 1 wherein said delay means delays said output pulse for a time interval somewhat less than the shortest time period between output pulses.

References Cited in the file of this patent

UNITED STATES PATENTS

| | | |
|---|---|---|
| 2,504,852 | Lewis | Apr. 18, 1950 |
| 2,546,407 | Rich | Mar. 27, 1951 |
| 2,597,353 | MacNichol | May 20, 1952 |
| 2,816,266 | Nadolski | Dec. 10, 1957 |
| 3,041,534 | Ramp et al. | June 26, 1962 |